United States Patent [19]

Harasin et al.

[11] Patent Number: 4,868,224

[45] Date of Patent: Sep. 19, 1989

[54] PROCESS FOR THE PRODUCTION OF MOLDED PRODUCTS USING INTERNAL MOLD RELEASE AGENTS

[75] Inventors: Stephen J. Harasin, Bethel Park; Michael F. Hurley; Timothy J. Kelly, both of Oakdale; Kenneth J. Naleppa, Pittsburgh; Neil H. Nodelman, Pittsburgh; Donald W. Schumacher, Bethel Park; Gregory H. Slocum, Pittsburgh; David F. Sounik, Bridgeville, all of Pa.

[73] Assignee: Mobay Corporation, Pittsburgh, Pa.

[21] Appl. No.: 260,650

[22] Filed: Oct. 21, 1988

[51] Int. Cl.$^4$ ............................................. C08G 18/14
[52] U.S. Cl. ................................... 521/124; 521/159; 528/49; 528/60; 528/65; 528/74.5; 528/75; 528/85; 264/51; 264/328.1; 264/328.6; 264/328.8
[58] Field of Search ................ 528/49, 60, 65, 74.5, 528/75, 85; 521/124, 159; 264/51, 328.1, 328.6, 328.8

[56] References Cited

U.S. PATENT DOCUMENTS

| | | | |
|---|---|---|---|
| 4,201,847 | 5/1980 | Kleimann et al. | 521/172 |
| 4,254,228 | 3/1981 | Kleimann et al. | 521/128 |
| 4,519,965 | 5/1985 | Taylor et al. | 264/51 |
| 4,581,386 | 4/1986 | Taylor et al. | 521/125 |
| 4,585,803 | 4/1986 | Nelson et al. | 521/105 |
| 4,764,537 | 8/1988 | Horn et al. | 521/51 |

FOREIGN PATENT DOCUMENTS 2101140 1/1983 United Kingdom .

Primary Examiner—Maurice J. Welsh
Attorney, Agent, or Firm—Gene Harsh; Joseph C. Gil

[57] ABSTRACT

The present invention is directed to a process for producing a molded product comprising
(A) reacting:
(i) an organic polyisocyanate having an isocyanate group content of from 5 to 45% by weight, preferably from 15 to 35% by weight, and most preferably from 20 to 35% by weight, prepared by reacting:
(a) an organic di- and/or polyisocyanate, and
(b) an active hydrogen containing fatty acid ester prepared by reacting an alcohol or polyol with an aliphatic, saturated or unsaturated fatty acid, said ester being characterized in that at least one aliphatic acid which contains more than 8 carbon atoms is built into the molecule, said ester further characterized as having an acid number of from 0 to 100 and a hydroxyl number of from 0 to 150 with at least one of said numbers being greater than zero, said ester having an average molecular weight of from 500 to 5000,
(ii) an isocyanate reactive component comprising:
(a) from about 0.5 to about 10% by weight based on the weight of components (ii)(b) and (ii)(c), of a zinc carboxylate containing from 8 to 24 carbon atoms per carboxylate group,
(b) from about 0.3 to 100% by weight, preferably from 0.5 to 95% by weight, more preferably from 5 to 45% by weight, and most preferably from 10 to 35% by weight, based on the weight of components (ii)(b) and (ii)(c), of a compatibilizer which compatibilizes said carboxylate in component (ii), and
(c) 0 to about 99.5% by weight, preferably from 5 to 99.5% by weight, more preferably from 55 to 95% by weight, and most preferably from 65 to 90% by weight, based on the weight of components (ii)(b), and (ii)(c), of at least one active hydrogen containing compound other than said compatibilizer, at an isocyanate index of from about 90 to about 400 and preferably from about 95 to about 115, in a closed mold,
(B) allowing the components to react, and
(C) removing the product from the mold.

10 Claims, No Drawings

PROCESS FOR THE PRODUCTION OF MOLDED PRODUCTS USING INTERNAL MOLD RELEASE AGENTS

BACKGROUND OF THE INVENTION

Internal mold release agents used in the production of molded polyurethane and polyurea products are known. U.S. Pat. Nos. 4,201,847 and 4,254,228 describe an internal mold release which is the reaction product of an organic polyisocyanate and an active hydrogen containing fatty acid ester.

More recently, zinc carboxylates containing from 8 to 24 carbon atoms per carboxylate group have been described (U.S. Pat. Nos. 4,519,965, 4,581,386, 4,585,803 and 4,764,537, and British Patent No. 2,101,140).

While each of these types of internal release agents has met with some success, neither is totally satisfactory for many applications. One shortcoming of all internal release agents to date, including those described above, is the inability to release from a bare metal mold, such as steel or aluminum, without first treating the internal surface of the mold with an external release agent.

DESCRIPTION OF THE INVENTION

The present invention is directed to a process for producing a molded product comprising:
(A) reacting:
  (i) an organic polyisocyanate having an isocyanate group content of from 5 to 45% by weight, preferably from 15 to 35% by weight, and most preferably from 20 to 35% by weight, prepared by reacting:
    (a) an organic di- and/or polyisocyanate, and
    (b) an active hydrogen containing fatty acid ester prepared by reacting an alcohol or a polyol with an aliphatic, saturated or unsaturated fatty acid, said ester being characterized in that at least one aliphatic acid which contains more than 8 carbon atoms is built into the molecule, said ester further characterized as having an acid number of from 0 to 100 and a hydroxyl number of from 0 to 150 with at least one of said numbers being greater than zero, said ester having an average molecular weight of from 500 to 5000,
  (ii) an isocyanate reactive component comprising:
    (a) from about 0.5 to about 10% by weight, based on the weight of components (ii), (b) and (ii), (c), of a zinc carboxylate containing from 8 to 24 carbon atoms per carboxylate group,
    (b) from about 0.5 to 100% by weight, preferably from 0.5 to 95% by weight, more preferably from 5 to 45% by weight, and most preferably from 10 to 35% by weight, based on the weight of components ii)b) and (ii), (c), of a compatibilizer which compatibilizes said carboxylate in component (ii), and
    (c) from 0 to about 99.5% by weight, preferably from 5 to 99.5% by weight, more preferably from 55 to 95% by weight, and most preferably from 65 to 90% by weight, based on the weight of components (ii), (b), and (ii), (c), of at least one active hydrogen containing compound other than said compatibilizer,
at an isocyanate index of from about 90 to abut 400 and preferably from about 95 to about 115, in a closed mold, (B) allowing the components to react, and
(C) removing the product from the mold.

It has been found that this particular combination of materials gives excellent release from a variety of different mold surfaces. Excellent release occurs when the mold surface has been pre-sprayed with an external release agent. Surprising, however, it has been found that release from a bare metal mold, such as steel or aluminum, is possible without any pre-application of external mold release agent to the mold surface.

The fatty acid esters useful herein are known and are described in U.S. Pat. Nos. 4,201,847 and 4,254,228, the disclosures of which are herein incorporated by reference.

Suitable fatty acid esters are those in which at least one aliphatic acid which contains more than 8 carbon atoms is built into the molecule and which have acid numbers of between 0 and 100, preferably between 0 and 40 and hydroxyl numbers between 0 and 150, preferably between 0 and 75, at least one of these two values being greater than 0.

The fatty acid esters used may also have the character of polyesters or mixed esters which may be prepared both from monofunctional and from polyfunctional carboxylic acids and/or alcohols.

The fatty acid esters may be prepared from several different types of fatty acids or carboxylic acids and/or alcohols or polyols. The fatty acid esters have an average molecular weight generally between 500 and 5000 and preferably between 800 and 3000.

Amines or amino alcohols may also be used in the preparation of the fatty acid esters to produce fatty acid mixed esters which contain basic or amide groups. Such mixed esters can be obtained, for example, by adding ammonia, monoalkylamines or dialkylamines or their alkoxylation products, for example with ethylene oxide, propylene oxide or higher epoxides or by using acid amides which contain carboxyl groups or alcohol groups. These acid amides may be obtained, for example, by the amidation of carboxylic acids with monoalkanolamines or dialkanolamines such as ethanolamine, diethanolamine, propanolamine, or dipropanolamine or the like.

The fatty acid esters used are preferably those which can be prepared by esterifying carboxylic acids with alcohols or polyols or which can be obtained from natural substrates. The following are examples of suitable alcohols and polyols: butanol, hexanol, octanol-isomers, dodecanol, oleyl alcohol, other fatty alcohols, natural or synthetic steroid alcohols, ricinoleic acid, ethylene glycol, propylene glycol, butanediols, hexanediols, glycerol, trimethylolpropane, pentaerythritol, sorbitol, hexitol, various sugars or addition products of alkylene oxides such as ethylene oxide or propylene oxide with these alcohols, and the like. Glycerol, trimethylolpropane, pentaerythritol and sorbitol are particularly suitable.

The carboxylic acids used may be saturated or unsaturated and are preferably aliphatic, for example octane carboxylic acids, dodecane acids, natural fatty acids such as ricinoleic acid, oleic acid, alaidic acid, stearic acid, palmitic acid, linoleic acid, linolenic acid, train oil fatty acids, fatty acids obtained from coconut oil, tallow fatty acids or fatty acids obtained by paraffin oxidation, tall oil fatty acids, succinic acid, maleic acid, citric acid, azelaic acid, adipic acid or higher dicarboxylic and polycarboxylic acids, oligomerization products of unsaturated carboxylic acids and addition products of maleic acid with natural and synthetic oils, and the like. The following are particularly suitable: oleic acid, linoleic acid, ricinoleic acid and adipic acid.

Preparation of the fatty acid esters is most suitably carried out by the co-condensation of the alcohols or polyols and acid at temperatures above 100° C., preferably at 120° to 180° C., optionally in a vacuum, the process of the elimination of water being continued until the desired hydroxyl and acid numbers or average molecular weights have been obtained. The process of esterification may, of course, be catalyzed with acid or basic catalysts and the water may be eliminated by azeotropic distillation. The products prepared and used according to the invention contain hydroxyl and/or carboxylic acid groups.

Fatty acid esters which have been found to be particularly suitable for the process are the co-condensates of oleic acid with a dicarboxylic acid such as adipic acid and a polyfunctional alcohol, e.g. pentaerythritol, which have molecular weights of between 900 and 2500 and hydroxyl numbers of between 30 and 70 and acid numbers of between 3 and 30.

There is not always a direct stoichiometric connection between the acid numbers and hydroxyl numbers obtained and the molar ratio of the components used, possibly because side reactions of unknown type take place side by side with esterification.

Ricinoleic acid polyesters which have a molecular weight of between 800 and 2500 are also of particular interest.

Starting polyisocyanate components suitable for reaction with the fatty acid esters include aliphatic, cycloaliphatic, araliphatic, aromatic and heterocyclic polyisocyanates of the type described, for example, by W. Siefken in Justus Liebigs Annalen der Chemie, 562, pages 72 to 136. Specific examples of these compounds are ethylene diisocyanate: 1,4-tetramethylene diisocyanate: 1,6-hexamethylene diisocyanate; 1,12-dodecane diisocyanate; cyclobutane-1,3-diisocyanate; cyclohexane-1,3- and -1,4-diisocyanate and mixtures of these isomers. Additional examples are 1-isocyanato-3,3,5-trimethyl-5-isocyanato-methyl cyclohexane (German Auslegeschrift No. 1,202,785, U.S. Pat. No. 3,401,190), 2,4- and 2,6-hexahydro-tolylene diisocyanate and mixtures of these isomers. Hexahydro-1,3- and/or -1,4-phenylene diisocyanate; perhydro-2,4'- and/or -4,4'-diphenylmethane diisocyanate; 1,3- and 1,4-phenylene diisocyanate: 1,4- and 2,6-tolylene diisocyanate and mixtures of these disomers are also suitable in the instant invention. Diphenylmethane-2,4- and/or -4,4'-diisocyanate: naphthylene-1,5-diisocyanate; triphenyl methane-4,4',4''-triisocyanate; polyphenyl polymethylene polyisocyanates of the type obtained by condensing aniline with formaldehyde, followed by phosgenation and described, for example, in British Pat. Nos. 874,430 and 848,671 may also be used in the present invention; m- and p-isocyanato-phenylsulfonyl isocyanates according to U.S. Pat. No. 3,454,606: perchlorinated aryl polyisocyanates of the type described, for example, in German Auslegeschrift No. 1,157,601 (U.S. Pat. No. 3,277,138); polyisocyanates containing carbodiimide groups of the type described in German Pat. No. 1,902,007 (U.S. Pat. No. 3,152,162): diisocyanates of the type described in U.S. Pat. No. 3,492,330; and polyisocyanates containing allophanate groups of the type described, for example, in British Pat. No. 993,890, in Belgian Pat. No. 761,626 and in published Dutch Patent Application No. 7,102,524 are still further examples of suitable isocyanates. Additionally, polyisocyanates containing isocyanurate groups of the type described, for example, in U.S. Pat. No. 3,001,973; in German Pat. Nos. 1,022,789; 1,222,067 and 1,027,394 and in German Offenlegungsschriften Nos. 1,929,034 and 2,004,408; polyisocyanates containing urethane groups of the type described, for example, in Belgian Pat. No. 752,261 or in U.S. Pat. No. 3,394,164: polyisocyanates containing acylated urea groups according to German Pat. No. 1,230,778 and polyisocyanates containing biuret groups of the type described, for example, in German Pat. No. 1,101,394 (U.S. Pat. Nos. 3,124,605 and 3,201,372) and in British Pat. No. 889,050 are also suitable.

Polyisocyanates produced by telomerization reactions of the type described, for example, in U.S. Pat. No. 3,654,106; polyisocyanates containing ester groups of the type described for example, in British Pat. Nos. 965,474 and 1,072,956, in U.S. Pat. No. 3,567,763 and in German Pat. No. 1,231,688; reaction products of the above-mentioned isocyanates with acetals according to German Pat. No. 1,072,385 and polyisocyanates containing polymeric fatty acid residues, according to U.S. Pat. No. 3,455,883 are still further examples of suitable isocyanate.

Aromatic polyisocyanates which are liquid at the processing temperature are preferably used. The particularly preferred starting polyisocyanates include derivatives of 4,4'-diisocyanato-diphenylmethane which are liquid at room temperature, for example, liquid polyisocyanates containing urethane groups of the type obtainable in accordance with German Pat. No. 1,618,380 (U.S. Pat. No. 3,644,457). These may be produced for example, by reacting 1 mol of 4,4'-diisocyanatodiphenylmethane with from 0.05 to 0.3 mols of low molecular weight diols or triols, preferably polypropylene glycols having a molecular weight below 700. Also useful are diisocyanates based on diphenylmethane diisocyanate containing carbodiimide and/or uretone imine groups of the type obtainable, for example, in accordance with German Pat. No. 10925007 (U.S. Pat. No. 3,152,162). Mixtures of these preferred polyisocyanates can also be used. In general, aliphatic and cycloaliphatic isocyanates are less suitable for the purposes of the instant invention.

Also preferred are the polyphenyl-polymethylene polyisocyanates obtained by the phosgenation of an aniline/formaldehyde condensate. Where reinforcing fiber mats are used, it is particularly preferred that such polyisocyanates have viscosities of 200 mPa.s or less at 25° C.

Reaction of the fatty acid ester or mixtures of fatty acid esters with the polyisocyanates is generally carried out by mixing the fatty acid ester with the polyisocyanate and reacting the components at temperatures between 20° C. and 200° C., preferably between 20° C. and 95° C., optionally with stirring. Lower reaction temperatures could also in principle be used but the length of time which would then be required for complete reaction of the components to obtain suitable reaction products for the process would be uneconomical. Although the reaction could be accelerated by means of catalysts, this should be avoided in order to prevent as far as possible any deleterious effect on the reactivity of the polyisocyanate components during the subsequent production of the molded product.

The molar ratio of active hydrogen atoms to isocyanate groups in the reaction of the fatty acid ester with the polyisocyanate is generally maintained between 1:1.1 and 1:25. The reaction products are frequently prepared by reacting a mixture of 0.5 to 25% by weight, (preferably 2 to 18% by weight) of fatty acid esters and 99.5 to 75% by weight (preferably 98 to 82% by weight) of polyisocyanate at a temperature of between 20° C. and 200° C. Prereaction in excess polyisocyanate results in a product which can be used directly ("modified" polyisocyanate).

The reaction products of polyisocyanates and fatty acid esters may also be prepared separately and later diluted with an additional quantity of polyisocyanate which may be a different polyisocyanate. Regardless of how the product is prepared, the isocyanate component generally has an isocyanate group content of from 5 to 45% by weight, preferably from 15 to 35% by weight, and most preferably from 20 to 35% by weight.

The suitable zinc carboxylates which may be used in the present invention are based on $C_8$–$C_{24}$, branched or straight chain fatty acids which may be saturated or unsaturated. The carboxylates also include the commercial preparations of a specific carboxylate which also contains impurities or by-products of other fatty acid derivatives. For example, commercial "stearates" may also contain significant quantities of palmitates, myrisates, etc. and commercial "tall oil" derivatives normally contain mixtures of stearates, palmitates, oleates, etc. Examples of specific zinc carboxylates include zinc stearate, zinc oleate, zinc octoate, zinc laurate, zinc behenate, zinc ricinoleate and the like.

The preferred zinc carboxylates are those which remain soluble in combination with the compatibilizer when in admixture with the isocyanate-reactive components. The most preferred zinc carboxylates are zinc laurate and zinc stearate, and especially those zinc stearates, having a high purity such as Zinc Stearate Polymer Grade Type N from Witco, Zinc Stearate RSN 131 HS and IPS from Mallinckrodt and Zinc Stearate Heat Stable Polymer Grade from Nuodex. The zinc carboxylates are used in amounts of about 0.5 to 10%, preferably about 1 to 6% and most preferably about 1 to 5%, by weight, based on the weight of all the isocyanate reactive components.

Suitable compatibilizers are those which assist in compatibilizing or solubilizing the zinc carboxylates in the compound(s) containing active hydrogen groups without substantially affecting the processing characteristics of the reaction mixture or the physical properties or paintability of the molded articles produced therefrom. In general, such compatibilizers will compatibilize the zinc carboxylate in the active hydrogen containing compound(s) but will not compatibilize the zinc carboxylate in the reacting mixture. Suitable compatibilizers are described in U.S. Pat. Nos. 4,519,965, 4,581,386, 4,585,803 and 4,764,537, and in U.S. application Ser. Nos. 239,153 and 239,366, both filed Aug. 31, 1988, 241,529, filed Sept. 7, 1988, and 243,522, filed Sept. 12, 1988, all the disclosures of which are herein incorporated by reference.

The preferred compatibilizers include nitrogen-containing, isocyanate-reactive, acyclic compounds such as aliphatic polyamines and nitrogen-containing isocyanate-reactive polymers, preferably polyethers. Preferred compatibilizers include polyether polyamines and amine- or hydroxyl-terminated, amine-initiated polyethers (i.e., polyethers obtained by the addition of alkylene oxides such as ethylene oxide and/or propylene oxide to aromatic or aliphatic polyamines, optionally followed by amination). Specific examples of these nitrogen-containing, isocyanatereactive polymers include polyoxypropylene diamine (supplied as Jeffamine D-230 from Texaco), polyoxypropylene diamine (supplied as Jeffamine D-400 from Texaco), polyoxypropylene diamine (supplied as Jeffamine D-2000 from Texaco), polyoxypropylene triamine (supplied as Jeffamine T-403 from Texaco), polyoxypropylene triamine (supplied as Jeffamine T-5000 from Texaco), an ethylene diamine-based polyether polyol (supplied as Multranol 4050 from Mobay) and toluene diamine-based polyether polyols (supplied as Multranol 9136 and 9166 from Mobay).

Even though any of the previously described compounds or polymers assist in compatibilizing or solubilizing the zinc carboxylates in the active hydrogen containing material, it has been found that the amine- or hydroxyl-terminated, amine-based polyethers provide long term stability of the zinc carboxylates, especially zinc stearates and zinc laurates without a gradual precipitation of the zinc stearates taking place. The amine-based polyethers provide this increased storage stability when they are used as the sole compatibilizing or solubilizing agent or when they are used in combination with the nitrogen-containing, isocyanate-reactive, acyclic compounds or, especially, the polyether polyamines.

Preferred amine-based polyethers are those initiated with an amine containing at least two nitrogens and which contain the group —N—C—C—N, i.e. wherein there are two carbons between the nitrogens. Examples of these amines include aliphatic amines such as ethylene diamine, diethylene triamine, etc. and heterocyclic amines such as piperazine or imidazolidine. Especially preferred are the alkoxylation products, preferably ethoxylation products and more preferably the propoxylation products of ethylene diamine such as the previously described Multranol 4050.

The amount of compatibilizer is generally dependent on the type of compatibilizer used. When the compatibilizer contains active hydrogen groups, it can be used in amounts of from 0.5 to 100% by weight, preferably from 0.5 to 95% by weight, more preferably from 5 to 45% by weight, and most preferably from 10 to 35% by weight, based on the total weight of all the active hydrogen containing compounds (including the contain active hydrogen groups, it can be used in amounts of from 0.5 to 10% by weight, and preferably from 1 to 6% by weight, based on the weight of active hydrogen containing compounds present.

Regardless of the compatibilizer chosen, it should be used in an amount which is sufficient to solubilize the zinc carboxylate so that the zinc carboxylate possesses improved resistance to precipitation.

Also necessary for preparing the molded product of the present invention is an isocyanate reactive component. As noted earlier, the isocyanate reactive component can consist of 100% by weight of compatibilizer. However, it is generally preferred to include additional isocyanate reactive compounds. These materials may be typically divided into two groups, high molecular weight compounds having a molecular weight of 400 to about 10,000 and low molecular weight compounds, i.e. chain extenders, having a molecular weight of 62 to 399. Examples of suitable high molecular weight compounds include the polyesters, polyethers, polythioethers, polyacetals and polycarbonates containing at least 2, preferably 2 to 8 and most preferably 2 to 4 isocyanate-reactive groups of the type known for the production of polyurethanes.

The high molecular weight polyethers suitable for use in accordance with the invention are known and may be obtained, for example, by polymerizing epoxides such as ethylene oxide, propylene oxide, butylene oxide, tetrahydrofuran, styrene oxide or epichlorohydrin in the presence of $BF_3$ or by chemically adding these epoxides, preferably ethylene oxide and propylene oxide, in admixture or successively to components containing reactive hydrogen atoms such as water, alcohols or amines. Examples of alcohols and amines include the low molecular weight chain extenders set forth hereinafter, 4,4'-dihydroxy diphenyl propane, sucrose, aniline, ammonia, ethanolamine and ethylene diamine. It is preferred to use polyethers which contain substantial amounts of primary hydroxyl groups in terminal positions (up to 90% by weight, based on all of the terminal hydroxyl groups present in the polyether). Polyethers modified by vinyl polymers, of the type formed, for example, by polymerizing styrene or acrylonitrile in the presence of polyether (U.S. Pat. Nos. 3,383,351; 3,304,273; 3,523,093; and 3,110,695: and German Patent No. 1,152,536), are also suitable, as are polybutadienes containing OH groups.

In addition, polyether polyols which contain high molecular weight polyadducts or polycondensates in finely dispersed form or in solution may be used. Such modified polyether polyols are obtained when polyaddition reactions (e.g., reactions between polyisocyanates and amino functional compounds) or polycondensation reactions (e.g., between formaldehyde and phenols and/or amines) are directly carried out in situ in the polyether polyols.

Suitable examples of high molecular weight polyesters include the reaction products of polyhydric, preferably dihydric alcohols (optionally in the presence of trihydric alcohols), with polyvalent, preferably divalent, carboxylic acids. Instead of using the free carboxylic acids, it is also possible to use the corresponding polycarboxylic acid anhydrides or corresponding polycarboxylic acid esters of lower alcohols or mixtures thereof for producing the polyesters. The polycarboxylic acids may be aliphatic, cycloaliphatic, aromatic, and/or heterocyclic and may be unsaturated or substituted, for example, by halogen atoms. The polycarboxylic acids and polyols used to prepare the polyesters are known and described for example in U.S. Pat. Nos. 4,098,731 and 3,726,952, herein incorporated by reference in their entirety. Suitable polythioethers, polyacetals, polycarbonates and other polyhydroxyl compounds are also disclosed in the above identified U.S. patents. Finally, representatives of the many and varied compounds which may be used in accordance with the invention may be found for example in High Polymers, Volume XVI, "Polyurethanes, Chemistry and Technology," by Saunders-Frisch, Interscience Publishers, New York, London, Vol. I, 1962, pages 32–42 and 44–54, and Volume II, 1964, pages 5–6 and 198–199; and in Kunststoff-Handbuch, Vol. VII, Vieweg-Hochtlen, Carl Hanser Verlag, Munich, 1966, pages 45–71.

Suitable aminopolyethers which may be used in accordance with the present invention as high molecular weight compounds (the molecular weight is always the average molecular weight which may be calculated from the functionality and the content of isocyanate-reactive groups) are those wherein at least about 30 and preferably about 60 to 100 equivalent % of the isocyanate-reactive groups are primary and/or secondary (preferably primary) aromatically or aliphatically (preferably aromatically) bound amino groups and the remainder are primary and/or secondary aliphatically bound hydroxyl groups.

In these compounds, the terminal residues carrying the amino groups may also be attached to the polyether chain by urethane or ester groups. These "aminopolyethers" are prepared by methods known per se. For example, polyhydroxypolyethers such as polypropylene glycol ethers may be aminated by reaction with ammonia in the presence of Raney nickel and hydrogen (BE-PS No. 634,741). US-PS No. 3,654,370 describes the production of Polyoxyalkylene polyamines by reaction of the corresponding polyol with ammonia and hydrogen in the presence of a nickel, copper, chromium catalyst. DE-PS No. 1,193,671 describes the production of polyethers containing terminal amino groups by hydrogenation of cyanoethylated polyoxypropylene ethers. Other methods for the production of polyoxyalkylene (polyether) amines are described in US-PS No. 3,155,728, US-PS No. 3,236,895 and FR-PS No. 1,551,605. The production of polyethers containing terminal secondary amino groups is described, for example, in FR-PS No. 1,466,708.

Polyhydroxypolyethers of relatively high molecular weight may be converted into the corresponding anthranilic acid esters by reaction with isatoic acid anhydride, as described, for example, in DE-OS Nos. 2,019,432 and 2,619,840 and in US-PS Nos. 3,808,250, 3,975,428 and 4,016,143. Polyethers containing terminal aromatic amino groups are formed in this way.

According to DE-OS No. 2,546,536 and US-PS No. 3,865,791, relatively high molecular weight compounds containing terminal amino groups are obtained by reaction of NCO prepolymers based on polyhydroxypolyethers with enamines, aldimines or ketimines containing hydroxyl groups and subsequent hydrolysis.

It is preferred to use amino polyethers obtained by hydrolysis of compounds containing terminal isocyanate groups, for example in accordance with DE-OS No. 2,948,419 or U.S. Pat. No. 4,515,923, herein incorporated by reference in its entirety. In this process, polyethers most preferably containing 2 to 4 hydroxyl groups are reacted with polyisocyanates to form NCO prepolymers and, in a second step, the isocyanate groups are converted by hydrolysis into amino groups.

The "aminopolyethers" used in accordance with the invention are often mixtures of the compounds mentioned by way of example and (on a statistical average) most preferably contain 2 to 4 terminal isocyanate-reactive groups. In the process according to the invention, the "aminopolyethers" may be used in admixture with polyhydroxypolyethers free from amino groups.

In accordance with the present invention, the high molecular weight compounds can be used in admixture with up to about 95% by weight based on the total quantity of active hydrogen containing compounds, of low molecular weight chain extenders. Examples of suitable hydroxyl group-containing chain extenders include ethylene glycol, 1,2- and 1,3-propane diol, 1,3- and 1,4- and 2,3-butane diol, 1,6-hexane diol, 1,10-decane diol, diethylene glycol, triethylene glycol, tetraethylene glycol, dipropylene glycol, tripropylene glycol, glycerol and trimethylol propane.

Other suitable chain extenders include aromatic polyamines, preferably diamines, having molecular weights of less than 400, especially the sterically hindered aromatic polyamines, preferably diamines, having molecular weights of less than 400, especially the sterically hindered aromatic diamines which contain at least one linear or branched alkyl substituent in the ortho-position to the first amino group and at least one, preferably two linear or branched alkyl substituents containing from 1 to 4, preferably 1 to 3, carbon atoms in the ortho-position to a second amino group. These aromatic diamines include 1-methyl-3,5-diethyl-2,4 -diamino benzene, 1-methyl-3,5-diethyl-2,6-diamino benzene, 1,3,5-trimethyl-2,4-diamino benzene, 1,3,5-triethyl-2,4-diamino benzene, 3,5,3',5'-tetraethyl-4,4'-diamino diphenylmethane, 3,5,3',5'-tetraisopropyl-4,4'-diamino diphenylmethane, 3,5-diethyl-3',5'-diisopropyl-4,4'-diamino diphenylmethane, 3,5-diethyl-5,5'-diisopropyl-4,4'-diamino diphenylmethane, 1-methyl-2,6-diamino-3-isopropylbenzene and mixtures of the above diamines. Most preferred are mixtures of 1-methyl-3,5-diethyl-2,4-diamino benzene and 1-methyl-3,5-diethyl-2,6-diamino benzene in a weight ratio between about 50:50 to 85:15, preferably about 65:35 to 80:20.

In addition, aromatic polyamines may be used in admixture with the sterically hindered chain extenders and include, for example, 2,4- and 2,6-diamino toluene, 4'- and/or 4,4'-diamino-diphenyl-methane, 1,2- and 1,4-phenylene diamine, naphthalene-1,5-diamine and triphenylmethane-4,4',4''-triamine. The difunctional and polyfunctional aromatic amine compounds may also exclusively or partly contain secondary amino groups such as 4,4'-di-(methylamino)-diphenylmethane or 1-methyl-2-methylamino-4-amino-benzene. Liquid mixtures of polyphenyl polymethylene-polyamines, of the type obtained by condensing aniline with formaldehyde, are also suitable. Generally, the nonsterically hindered aromatic diamines and polyamines are too reactive to provide sufficient processing time in a RIM system. Accordingly, these diamines and polyamines should generally be used in combination with one or more of the previously mentioned sterically hindered diamines or hydroxyl group-containing chain extenders.

It is particularly preferred to utilize the isocyanate-reactive composition described in U.S. application Ser. No. 076,827, filed on July 23, 1987. Such composition broadly comprises
 (i) at least one polyether polyol having a hydroxy functionality of from 2 to 8, preferably 2 to 4, and a molecular weight of from 350 to below 1800, preferably from 350 to 1100, and
 (ii) at least one hydroxylgonal organic material containing from 2 to 8 hydroxyl groups, preferably 2 or 3 and having a molecular weight of below 350, components (i) and (ii) being used in a weight ratio of (i) to (ii) of from about 10:1 to about 1:10, and
 (iii) no more than 45% by weight based on the total weight of component (i), (ii) and (iii), of an active hydrogen containing compound having a molecular weight of 1800 or more.

Further details as to the above composition can be found in the above-identified U.S. application.

Other additives which may be used in the present invention include catalysts, especially tin(II) salts of carboxylic acids, dialkyl tin salts of carboxylic acids, dialkyl tin mercaptides, dialkyl tin dithioesters and tertiary amines. Preferred among these catalysts are dibutyl tin dilaurate and 1,4-diazabicyclo-(2,2,2)-octane (triethylene diamine), especially mixtures of these catalysts. The catalysts are generally used in amounts of about 0.01 to 10%, preferably about 0.05 to 2%, based on the weight of the isocyanate reactive component. In some instances, such as where the compatibilizer contains tertiary amine groups, no additional catalyst may be necessary.

It is also possible to use surface-active additives such as emulsifiers and foam stabilizers. Examples include N-stearyl-N',N'-bis-hydroxyethyl urea, oleyl polyoxyethylene amide, stearyl diethanol amide, isostearyl diethanolamide, polyoxyethylene glycol monoleate, a pentaerythritol/adipic acid/oleic acid ester, a hydroxy ethyl imidazole derivative of oleic acid, N-stearyl propylene diamine and the sodium salts of castor oil sulfonates or of fatty acids. Alkali metal or ammonium salts of sulfonic acid such as dodecyl benzene sulfonic acid or dinaphthyl methane sulfonic acid and also fatty acids may also be used as surface-active additives.

Suitable foam stabilizers include water-soluble polyether siloxanes The structure of these compounds is generally such that a copolymer of ethylene oxide and propylene oxide is attached to a polydimethyl siloxane radical. Such foam stabilizers are described in U.S. Pat. No. 2,764,565. In addition to the catalysts and surface-active agents, other additives which may be used in the molding compositions of the present invention include known blowing agents, cell regulators, flame retarding agents, plasticizers, dyes, fillers and reinforcing agents such as glass in the form of fibers or flakes or carbon fibers.

The molded products of the present invention are prepared by reacting the components in a closed mold. The compositions according to the present invention may be molded using conventional processing techniques at isocyanate indexes ranging from as low as 90 to as high as 400 (preferably from 95 to 115) and are especially suited for processing by the RIM process. In general, two separate streams are intimately mixed and subsequently injected into a suitable mold, although it is possible to use more than two streams. The first stream contains the polyisocyanate component, while the second stream contains the isocyanate reactive components and any other additive which is to be included.

The invention is further illustrated but is not intended to be limited by the following examples in which all parts and percentages are by weight unless otherwise specified.

EXAMPLES

(A) Isocyanates (i) ISO: a polymethylenepoly(phenylisocyanate) containing about 58% by weight of diisocyanate, having a viscosity at room temperature of about 50 cp, and having an NCO content of about 32% by weight.

(ii) PREPOLYMER: 95 parts by weight of ISO were weighed into a drum. 5 parts of a fatty acid ester (the reaction product of 6 moles of oleic acid, 1 mole of adipic acid, and 2.5 moles of pentaerythritol, having an OH number of about 51, and an equivalent weight of about 1050) were added to the drum with high speed mixing. The mixture was stirred at room temperature for 30 minutes. The resultant prepolymer had an equivalent weight of 138, and a viscosity of 65 cps at room temperature.

(B) ZNS: zinc stearate.

(C) COMPATIBILIZER: a 356 molecular weight ethylene diamine/propylene oxide adduct.

(D) OTHER ACTIVE HYDROGEN CONTAINING COMPOUNDS:
 (i) POLYOL-A a 425 molecular weight polypropylene glycol.

(ii) EG ethylene glycol.
(iii) POLYOL-B: a 400 molecular weight polyethylene glycol.
(iv) POLYOL-C: a glycerin/propylene glycol (weight ratio of 9:1) initiated propylene oxide/ethylene oxide (weight ratio of 9:1) adduct having secondary hydroxyl termination and having an OH number of 56.
(v) DEG: diethylene glycol.

(E) CATALYSTS
(i) PC-15: Polycat 15, a tertiary amine catalyst available from Air Products.
(ii) 33LV: a 33% solution of triethylene diamine in diethylene glycol.
(iii) 610: Polycat SA-610-50, an amine catalyst available from Air Products.

(F) MISCELLANEOUS
(i) PIGMENT: a 40% mixture of carbon black in ethylene glycol.
(ii) DC-193: a polysiloxane available from Dow Corning.
(iii) WATER.

Example 1 (comparative)

A B-side was prepared by mixing 50 parts of POLYOL-A, 30 parts of EG, 22 parts of COMPATIBILIZER, 4 parts of ZNS and 2 parts of PC-15. The A-side consisted of ISO. This system was run on a KM-160 RIM machine. A 10 mm mixhead was used with A-side and B-side pressures set at approximately 120 and 100 bars, respectively. The temperatures of both sides were maintained at about 90° F. with the mold temperature at 165° F. A 15"×15"×⅛" steel mold was used. The weight ratio of A-side to B-side was 185 parts to 100 parts. The mold was cleaned prior to any experiments using Chemtrend 201B, an N-methyl pyrrolidone based mold cleaner available from Chemtrend. Before the first series of experiments, the mold was first sprayed with Chemtrend 2006, a standard wax based release available from Chemtrend, and the wax was then buffed into the mold surface. Release was then evaluated with both a light spray of Chemtrend 2006 and a heavy spray of Chemtrend 2006 onto the buffed surface. Two sheets of 2 oz/ft$^2$ random continuous strand glass mat (available from Owens Corning) were placed in the mold following the release agent application. Release was good for the first part molded after spraying, only fair for the second part and poor for the third part.

Example 2 (comparative)

Example 1 was repeated using as the B-side, a mixture of 50 parts of POLYOL-A, 30 parts of EG, 20 parts of COMPATIBILIZER, 2 parts of 33LV and 0.5 parts of 610. The A-side consisted of PREPOLYMER. The weight ratio of A-side to B-side was 198 to 100. Several releases were possible using the wax-coated mold. However, when using a bare steel mold (i.e., after cleaning with Chemtrend 201B), the first molded part adhered strongly to the mold and the second part adhered even more strongly.

Example 3

Example 1 was repeated using the same B-side as was used in Example 1 and using the A-side of Example 2. The weight ratio of A-side to B-side was 194 to 100. When using the wax-coated mold, 40 releases were obtained at which point the chemicals were all used up.

Example 4

Example 1 was repeated using a B-side consisting of 50 parts of POLYOL A, 28 parts of EG, 20 parts of COMPATIBILIZER, 3.3 parts of PIGMENT, 4 parts of ZNS, 2 parts of PC-15 and 0.5 parts of 610. The A-side was the same as used in Example 2. The ratio of A-side to B-side was 192 to 100. The mold used was a 12"×12"×0.085" steel mold. The mold was cleaned as in Example 1, but no wax was applied. One sheet of 2 oz/ft$^2$ random continuous strand glass mat (available from Owens Corning) was placed in the mold. The first 10 parts were demolded at 45 seconds with good release. Parts 11 and 12 were demolded at 30 seconds with somewhat poorer release, but returning to a 45 second demold gave good release through part number 20. After the 20th part, the mold was wiped with a clean rag. Good release was observed for the 21st through 23rd parts, with signs of sticking showing during the demold of the 24th through 28th parts. After the 28th part, the mold was buffed with clean brass wool. The release was good through the 40th part at which time the chemicals ran out. The storage containers were refilled with the above compositions surface being buffed lightly with the brass wool after every ten parts.

Example 5

Example 4 was exactly repeated using 22 parts of COMPATIBILIZER instead of 20 parts and substituting 50 parts of POLYOL-B for the 50 parts of POLYOL-A. In all other respects, the same conditions were used. Thirty five parts were molded with excellent release without the use of the brass wool.

Example 6

Example 4 was again repeated using a B-side consisting of 40 parts of POLYOL-A, 20 parts of POLYOL-C, 22 parts of COMPATIBILIZER, 20 parts of EG, 2 parts of WATER, 2 parts of DC-193, 4 parts of ZNS and 2 parts of PC-15. The A-side consisted of PREPOLYMER. The weight ratio of A-side to B-side was 170 to 100. The mold used was that used in Example 1, except that the mold was not sprayed with wax. One sheet of 1 oz/ft$^2$ random continuous strand glass mat (available from Owens Corning) was placed in the mold. 23 parts were made with excellent release.

Example 7

A B-side was prepared from 57 parts of DEG, 31 parts of COMPATIBILIZER, 2 parts of ZNS, 7 parts of POLYOL-C, 2 parts of WATER, 2 parts of DC-193, and 1 part of PC-15. The A-side consisted of PREPOLYMER. The weight ratio of A-side to B-side was 229 to 100. The system was run on the same equipment as used in Example 1 except that the shot volume was reduced to give a final molded density of about 0.5 g/cc when one sheet of 1 oz./ft$^2$ glass was laid in the mold. Good release was observed on the first two parts and excellent release was observed on the next eighteen parts.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for producing a molded product comprising:
   (A) reacting
      (i) an organic polyisocyanate having an isocyanate group content of from 5 to 45% by weight, prepared by reacting:
         (a) an organic di- and/or polyisocyanate, and
         (b) an active hydrogen containing fatty acid ester prepared by reacting an alcohol or polyol with an aliphatic, saturated or unsaturated fatty acid, said ester being characterized in that at least one aliphatic acid which contains more than 8 carbon atoms is built into the molecule, said ester further characterized as having an acid number of from 0 to 100 and a hydroxyl number of from 0 to 150 with at least one of said numbers being greater than zero, said ester having an average molecular weight of from 500 to 5000,
      (ii) an isocyanate reactive component comprising:
         (a) from about 0.5 to about 10% by weight, based on the weight of components (ii), (b) and (ii), (c), of a zinc carboxylate containing from 8 to 24 carbon atoms per carboxylate group,
         (b) from about 0.5 to 100% by weight, based on the weight of components (ii), (b) and (ii), (c), of a compatibilizer which compatibilizes said carboxylate in component (ii), and
         (c) from 0 to about 99.5% by weight, based on the weight of components (ii) (b) and (ii) (c), of at least one active hydrogen containing compound other than said compatibilizer,
   at an isocyanate index of from about 90 to about 400, in a closed mold,
   (B) allowing the components to react, and
   (C) removing the product from the mold.

2. The process of claim 1 wherein the isocyanate group content of component (i) is from 15 to 35% by weight.

3. The process of claim 2 wherein said isocyanate group content is from 20 to 35% by weight.

4. The process of claim 1 wherein the amount of component (ii) (b) is from 0.5 to 95% by weight.

5. The process of claim 4 wherein the amount of component (ii) (b) is from 5 to 45% by weight.

6. The process of claim 5 wherein the amount of component (ii) (b) is from 10 to 35% by weight.

7. The process of claim 1 wherein said isocyanate index is from about 95 to about 115.

8. The process of claim 1 wherein said zinc carboxylate is selected from the group consisting of zinc stearate and zinc laurate.

9. The process of claim 1 wherein said mold is a bare metal mold.

10. The process of claim 9 wherein said mold is a bare steel mold.

* * * * *